(12) United States Patent
Inoue et al.

(10) Patent No.: US 8,329,068 B2
(45) Date of Patent: Dec. 11, 2012

(54) BLACK RESIN COMPOSITION, RESIN BLACK MATRIX, COLOR FILTER AND LIQUID CRYSTAL DISPLAY

(75) Inventors: Yoshihiko Inoue, Shiga (JP); Wataru Fukushima, Shiga (JP); Akihiko Watanabe, Shiga (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 12/532,136

(22) PCT Filed: Mar. 19, 2008

(86) PCT No.: PCT/JP2008/055076
§ 371 (c)(1),
(2), (4) Date: Sep. 18, 2009

(87) PCT Pub. No.: WO2008/123097
PCT Pub. Date: Oct. 16, 2008

(65) Prior Publication Data
US 2010/0038606 A1   Feb. 18, 2010

(30) Foreign Application Priority Data

Mar. 20, 2007   (JP) .................................. 2007-072396

(51) Int. Cl.
G02B 5/23 (2006.01)
G02F 1/1335 (2006.01)

(52) U.S. Cl. ........ 252/586; 349/106; 349/107; 349/138; 428/1.1; 428/220; 430/7; 430/270.1

(58) Field of Classification Search ................. 252/586; 428/220, 1.1; 349/114, 106, 107, 138; 430/7, 430/270.1
See application file for complete search history.

(56) References Cited

U.S. PATENT DOCUMENTS

| 6,149,777 A | 11/2000 | Ngan et al. |
| 2007/0059612 A1 | 3/2007 | Yoshioka |
| 2008/0318018 A1* | 12/2008 | Segawa et al. ................ 428/220 |

FOREIGN PATENT DOCUMENTS

| EP | 0818556 A1 | 1/1998 |
| JP | 61-278558 A | 12/1986 |
| JP | 2000-056126 A | 2/2000 |
| JP | 2000057633 A | 2/2000 |
| JP | 2000-143985 A | 5/2000 |
| JP | 2001-244548 A | 9/2001 |
| JP | 2001-322473 A | 11/2001 |
| JP | 2003049201 A | 2/2003 |
| JP | 2003-252955 A | 9/2003 |
| JP | 2004-339499 A | 12/2004 |
| JP | 2005-075965 A | 3/2005 |
| JP | 2005179121 A | 7/2005 |
| JP | 2006-143150 A | 6/2006 |
| JP | 2006-257012 A | 9/2006 |
| WO | 2005/037926 A1 | 4/2005 |
| WO | 2006/070794 A1 | 7/2006 |
| WO | 2006/079887 A2 | 8/2006 |
| WO | 2007/001120 A1 | 1/2007 |

OTHER PUBLICATIONS

H. Jiang, K. Tao, H. Li, Structure of TINx (0 < x < 1.1) films prepared by ion beam-assisted deposition, Thin Solid Films 258 (1995) 51-55.*
J. Li et al., "Synthesis of nanocrystalline titanium nitride powders by direct nitridation of titanium oxide" Journal of the American Ceramic Society, vol. 84, No. 12, pp. 3045-3047.
B. Vaidhyanathan et al., "Synthesis of Ti, Ga, and V nitrides: microwave-assisted carbothermal reduction and nitridation" Chemistry of Materials, vol. 9, No. 5, May 1, 1997, pp. 1196-1200.
Supplementary European Search Report in related application PCT/JP2008055076, mailed Mar. 18, 2010.
International Search Report issued on Jun. 24, 2008 in International Application No. PCT/JP2008/005076.

* cited by examiner

Primary Examiner — Bijan Ahvazi
(74) Attorney, Agent, or Firm — Pillsbury Winthrop Shaw Pittman LLP

(57) ABSTRACT

A black resin composition capable of forming a black matrix having high OD value and high adhesion as well as high resistance is disclosed. The black resin composition is a black resin composition comprising at least a light shielding agent, a resin and a solvent, which light shielding agent contains at least titanium nitride compound particles, wherein the angle of diffraction 2θ of the peak originated from (200) plane of the titanium nitride compound particles when CuKα line is used as the X-ray source is not less than 42.5° and not more than 42.8°. Using this black resin composition allows a thin resin black matrix having a high light shielding property and high resistance to be readily attained.

6 Claims, 1 Drawing Sheet

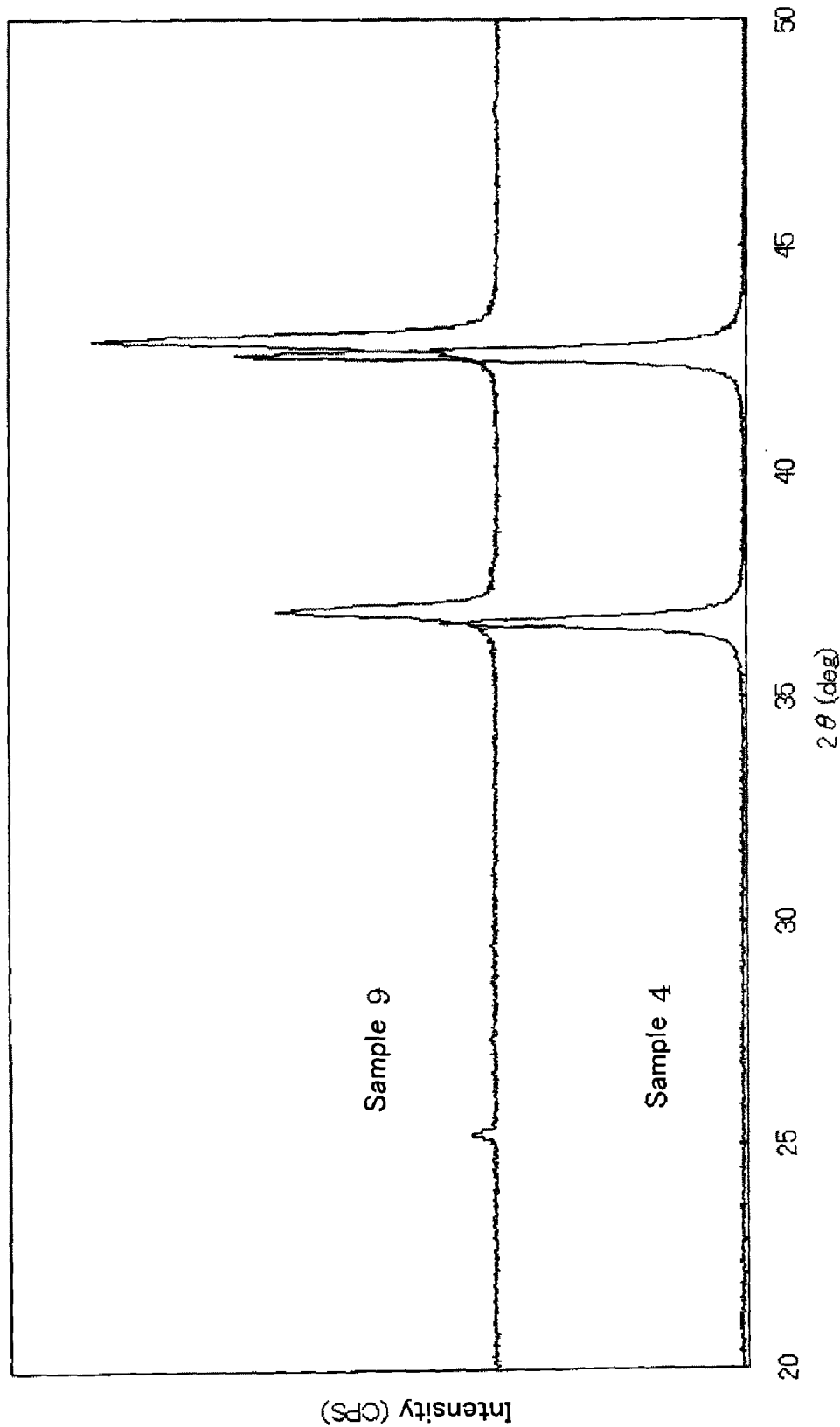

BLACK RESIN COMPOSITION, RESIN BLACK MATRIX, COLOR FILTER AND LIQUID CRYSTAL DISPLAY

CROSS REFERENCE TO RELATED APPLICATIONS

This application is a U.S. National phase of International Application No. PCT/JP2008/055076, filed Mar. 19, 2008, which claims priority to Japanese Patent Application No. 2007-072396, filed in Japan on Mar. 20, 2007. The contents of both applications are incorporated herein by reference in their entireties.

TECHNICAL FIELD

The present invention relates to a black resin composition optimum for producing a black matrix constituting a display apparatus with a light source such as a cold-cathode tube and an LED, a resin black matrix using the black resin composition, a color filter for liquid crystal displays using the resin black matrix, as well as a liquid crystal display.

BACKGROUND ART

Liquid crystal displays are apparatuses for displaying images and characters and for carrying out information processing by utilizing the electro-optical response of liquid crystal, and are widely employed for large display size uses such as personal computers, monitors, liquid display television sets and, in recent years, also for middle and small display size uses such as cellular phones, personal digital assistances, and car navigation systems. Such liquid crystal displays usually have a structure in which a liquid crystal layer is sandwiched between a pair of substrates, and can express light and dark utilizing the electro-optical response of liquid crystal layers caused by externally-applied electric field. They are also able to display colors by using color filters comprising pixels having color selectivity.

Conventionally, metal thin films utilizing chromium-based materials have been used as a black matrix material. Recently, from the viewpoint of cost and environmental pollution, resin black matrices comprising resins and light shielding materials are used. The resin black matrix is obtained by coating the black resin composition containing a light shielding agent such as the resin and carbon black on a substrate and drying to form a black coated film, followed by micro-patterning into lattices by photolithography. For instance, Patent Literature 1 describes the resin black matrix in which a carbon black is dispersed in a non-photosensitive polyimide resin.

Yet, along with recent demand for a thinner color filter and a higher performance, as well as along with higher luminance of a back light used in the liquid crystal displays, demand for a higher OD value is increasing and the OD value in the conventional resin black matrices was not sufficient. In cases where the resin black matrix is thick, problems arise in that flatness of the color filter is deteriorated lower and thus the alignment of the liquid crystal is disturbed due to increased surface steps generated by color pixels running over onto the resin black matrix, so that demand for a thinner resin black matrix is increasing.

Increasing the volume ratio of the light shielding agent allows the higher OD value and thinner film to be attained but, on the other hand, causes a decrease in the ratio of the resin in the black matrix. Problems arise in that the adhesion of the resin black matrix to glass decreases and the resin black matrix is peeled off and that sufficient resistance cannot be attained. Therefore, a light shielding material by which a higher OD can be attained even if the content is small is needed.

As the light shielding agent, carbon black, titanium black such as low oxidized titanium and titanium nitride oxide, metal oxides such as iron oxide, and mixtures of other organic pigments are used. The carbon black and titanium nitride oxide have become the mainstream.

In regard to the carbon black, various efforts have been made in order to obtain a coated film with a high OD value and Patent Literature 2 has been, for instance, disclosed. Patent Literature 2 describes that the resin black matrix with the OD value of 3.5 per a film thickness of 1.0 μm can be obtained by defining a primary particle diameter, DBP absorption, and pH of the carbon black, as well as the amine value and molecular weight of organic compounds which are concomitantly used. However, the OD value is not sufficient and the resistant value is as low as not more than $1 \times 10^6$, so that that they cannot be used for applications in which an insulation performance is required.

Meanwhile, titanium nitride oxide obtained by partially nitriding oxygen in titanium dioxide or titanium hydroxide is used in a resin black matrix having high resistance. In order to obtain the high OD value, it is crucial not to include white titanium dioxide during nitriding, and various studies therefore have been made (Patent Literatures 3 and 4). In particular, Patent Literature 4 describes that a titanium nitride oxide with a higher nitriding degree and a smaller crystallite diameter could be obtained by optimizing a heating calcination temperature when titanium oxide undergoes nitriding-reduction. A resin black matrix with the OD value of 4.0 per a film thickness of 0.8 μm could be reportedly obtained by utilizing the titanium nitride oxide. However, titanium nitride oxide contains a large amount of alkali metals such as Na, K, Mg, and Ca originated from a production method including nitriding reduction, which causes a decrease in adhesion between the resin black matrix and glass, and a decrease in the resistance (Patent Literature 5). Thus, there was a problem in that a procedure for removing the alkali metals such as K and Na, including ion exchange with an ion exchange resin and wash with pure water, was required and hence productivity decreased.

Meanwhile, another example of the black pigment is titanium nitride (Patent Literature 6). The technique utilizing titanium nitride compound particles with a diameter of not more than 200 nm in the use of solar isolation shielding has been disclosed (Patent Literature 7). The physical property was optimized with the aim of minimizing transmittance near the infrared region (800-2500 nm) and attaining high transmittance in the visible wavelength region. However, it was not satisfactory in view of minimum transmittance in the visible wavelength region, in other words, in view of the degree of blackness which is required as the black matrix.

In addition, to form a titanium nitride film and to use it as a black matrix is disclosed in Patent Literature 8. However, it was difficult to form the film on a substrate because the film is not formed by coating a black composition.

Patent Literature 1: Japanese Patent No. 3196638 (pages 1 and 9-11, and Table 1)
Patent Literature 2: Japanese Laid-open Patent Application (Kokai) No. 2004-292672
Patent Literature 3: Japanese Laid-open Patent Application (Kokai) No. 2005-514767
Patent Literature 4: Japanese Laid-open Patent Application (Kokai) No. 2006-209102
Patent Literature 5: Japanese Laid-open Patent Application (Kokai) No. 2004-4651

Patent Literature 6: Japanese Laid-open Patent Application (Kokai) No. 64-37408
Patent Literature 7: Japanese Laid-open Patent Application (Kokai) No. 2005-179121
Patent Literature 8: Japanese Laid-open Patent Application (Kokai) No. 10-104663

DISCLOSURE OF THE INVENTION

Problems to be solved by the Invention

In view of the above-described drawbacks of the prior art, an object of the present invention is to provide a black resin composition capable of forming a black matrix that has the high OD value and high adhesiveness as well as high resistance value. By using such a black resin composition, a resin black matrix which is thin and has a high OD value and which is highly adhesive can be obtained. As a result, a color filter having higher flatness without an over-coat can be provided. Additionally, by using such a color filter, a liquid crystal display with superior display performance can be attained.

Means for Solving the Problems

In order to solve the problems in the prior art, the present inventors intensively studied to discover that the above-described problems to be solved by the present invention may be solved by using a specific titanium nitride compound particles described below as a light shielding agent.

The object of the present invention is attained by the following constitutions:

(1) A black resin composition comprising at least a light shielding agent, a resin and a solvent, the light shielding agent containing at least titanium nitride compound particles, wherein the angle of diffraction 2θ of the peak originated from (200) plane of the titanium nitride compound particles when CuKα line is used as the X-ray source is not less than 42.5° and not more than 42.8°.
(2) The black resin composition according to (1), wherein the angle of diffraction 2θ originated from the (200) plane of the titanium nitride compound particles when CuKα line is used as the X-ray source is not less than 42.5° and less than 42.7°.
(3) The black resin composition according to (1) or (2), wherein the crystallite size determined from half bandwidth of the peak originated from the (200) plane when CuKα line is used as the X-ray source is not more than 50 nm.
(4) The black resin composition according to any one of (1) to (3), wherein the specific surface area of the titanium nitride compound particles determined by BET method is not less than 5 m$^2$/g and not more than 100 m$^2$/g.
(5) The black resin composition according to any one of (1) to (4), wherein the amount of oxygen atoms contained in the titanium nitride compound particles is not more than 12% by weight.
(6) The black resin composition according to any one of (1) to (5), wherein the titanium nitride compound particles are prepared by thermal plasma method.
(7) A resin black matrix formed of a coated film of the black resin composition according to any one of (1) to (6), which resin black matrix has an optical density (OD value) of not less than 4.0 per 1.0 μm of film thickness.
(8) A color filter comprising the resin black matrix according to (7).
(9) A liquid crystal display comprising the color filter according to (8)

Effects of the Invention

By using the black resin composition of the present invention, an effect that a thin resin black matrix is readily obtained, which resin black matrix has a high light shielding and a high resistant value, is obtained.

BRIEF DESCRIPTION OF THE DRAWINGS

FIG. 1 shows the intensity spectra of the angle of diffraction 2θ of titanium nitride compound particles according to the present invention and of a conventional titanium black.

BEST MODE FOR CARRYING OUT THE INVENTION

The present invention will be further described below in detail.

The black resin composition according to the present invention contains at least the light shielding agent, a resin and a solvent. The black resin composition needs to contain titanium nitride compound particles having at least a specific property as the light shielding agent. Desired properties will now be described below.

The black resin composition according to the present invention can be used to produce printing ink, ink jet ink, material for photomask production, material for proof printing production, etching resist, solder resist, bulkheads of plasma display panel (PDP), derivative pattern, electrode (conductor circuit) pattern, circuit pattern of electronic component, conductive paste, conductive film, light shielding image such as black matrix and the like. Preferably, the black resin composition can be advantageously employed to set a light shielding image (including black matrix) in a gap of a coloring pattern, vicinity portions, and in the side of the outside light of TFT and the like to improve a display property of a color filter for the color liquid crystal display.

Especially preferably, the black resin composition is used as a black matrix used for the black edges formed on the periphery portion, lattice- or stripe-like black portions between color picture elements of red, blue and green, more preferably, dotted and linear black patterns for TFT light shielding in display apparatuses such as liquid crystal displays, plasma displays, EL displays equipped with inorganic EL, CRT displays.

The titanium nitride compound particles used as the light shielding agent in the present invention contain titanium nitride as a main component and usually titanium oxide TiO$_2$, low order titanium oxide represented by Ti$_n$O$_{2n-1}$ (1≦n≦20) and titanium nitride oxide represented by TiN$_x$O$_y$ (0<x<2.0, 0.1<y<2.0) as accessory components. The titanium nitride compound particles are characterized in the angle of diffraction 2θ originated from (200) plane of not less than 42.5° and not more than 42.8° when CuKα line is used as the X-ray source. Use of the titanium nitride compound particles as the light shielding agent enables the resin black matrix of the present invention to attain the high OD value while keeping a concentration of the light shielding agent in the black resin composition low. As a result, the resin black matrix according to the present invention can secure high adhesion. Further, since the resin black matrix of the present invention has a high OD value per a unit film thickness, its film thickness at a practical OD value (4.0) is not more than 1.0 μm. Consequently, a color filter having a practically acceptable flatness may be attained even using the resin black matrix without using an over-coat.

As for the X-ray diffraction spectrum of the titanium compound when CuKα line is used as the X-ray source, as the peak with the strongest intensity, the angle of diffraction 2θ of the peak originated from (200) plane of TiN is seen neighborhood of 2θ=42.5° whereas the angle of diffraction 2θ of the peak originated from (200) plane of $TiO_2$ is seen neighborhood of 2θ=43.4°. On the other hand, although the peaks are not the ones with the strongest intensity, the angle of diffraction 2θ of the peak originated from (200) plane of anatase-type $TiO_2$ is observed neighborhood of 2θ=48.1° whereas the angle of diffraction 2θ of the peak originated from (200) plane of rutile-type $TiO_2$ is seen neighborhood of 2θ=39.2°. Thus, in the titanium compound with a crystal structure having nitrogen atoms and oxygen atoms, the peak with the strongest intensity is seen within the range where the angle of diffraction 2θ is not less than 42.5° and less than 43.4°. As the content of oxygen atoms in the crystal state increases, the peak position shifts to higher angle side compared to 42.5°.

In order to express the effect of the present invention, the angle of diffraction 2θ of the peak originated from (200) plane of the titanium nitride compound particles is preferably not less than 42.5° and not more than 42.8°, more preferably not less than 42.5° and less than 42.7°. In the titanium nitride oxide obtained by nitriding titanium oxide, the peak with the strongest intensity is confirmed within the range where the angle of diffraction 2θ is from 42.9° to 43.2°. (Japanese Laid-open Patent Application (Kokai) No. 2006-209102), so that it has different crystal structure from that of titanium nitride compound used in the present invention. When titanium oxide $TiO_2$ is contained as an accessory component, as the peak with the strongest intensity, the angle of diffraction 2θ of the peak originated from anatase-type $TiO_2$ (101) is seen neighborhood of 2θ=25.3° whereas the angle of diffraction 2θ of the peak originated from rutile-type $TiO_2$ (110) is seen neighborhood of 2θ=27.4°. Yet, since $TiO_2$ is white and could be thus a factor which deteriorates the light shielding performance of the black matrix, it is preferred that $TiO_2$ be decreased to the extent where it is not observed as the peak.

The size of crystallite constituting the titanium nitride compound particles can be determined from the halfwidth band of X-ray diffraction peak according to the Scherrer's formula shown in the equations below (1) and (2).

Equation (1)

$$\text{Crystallite size (nm)} = \frac{K\lambda}{\beta \cos\theta} \quad (1)$$

Equation (2)

$$\beta = \sqrt{\beta_e^2 - \beta_o^2} \quad (2)$$

wherein K=0.9, λ=0.15418 nm, $\beta_e$: half bandwidth of the diffraction peak, $\beta_o$: corrected value of the half bandwidth (0.12°), wherein β, $\beta_e$, and $\beta_o$ are calculated in radians.

The titanium nitride compound particles used in the present invention contains TiN as a main component and usually partially contains oxygen atoms resulted from contamination of oxygen when synthesized, and for oxidation of the particle surface, which is especially marked when particle size is small. Since the less the oxygen contained, the higher the attained OD value, less oxygen is preferred. In particular it is preferred for the particle not to contain $TiO_2$ as an accessory component. The content of the oxygen atoms is preferably not more than 12% by weight, more preferably not more than 8% by weight.

The content of titanium atoms can be analyzed by ICP optical emission spectrometry. The content of nitrogen atoms can be analyzed by inert gas fusion-thermal conductivity method. The content of oxygen atoms can be analyzed by inert gas fusion-infrared absorption method.

In order to make the effects of the present invention prominent, the crystallite size is preferably not more than 50 nm, more preferably not less than 20 nm and not more than 50 nm. By forming the black matrix with titanium nitride compound particles having the crystallite size of not more than 50 nm, the transmitted light of the coated film exhibits blue to blue violet color with the peak wavelength thereof of not more than 475 nm. Thus a black matrix having a high light shielding performance can be obtained. In addition, because ultraviolet rays transmittance (particularly i-ray transmittance (365 μm)) is higher than those of the conventional light shielding agents, even in the case of photosensitive black resin composition, sufficient curing of the film can be attained, and a black matrix having a high OD value and having an excellent shape can be obtained. Moreover, by using a titanium nitride compound particles having a crystallite size of not less than 20 nm and not more than 50 nm, a black matrix having a higher resistance can be formed, which is preferred.

The specific surface area of the titanium nitride compound particles of the present invention can be determined by BET method and is preferably not less than 5 m$^2$/g and not more than 100 m$^2$/g, more preferably not less than 10 m$^2$/g and not more than 60 m$^2$/g. Based on the specific surface area determined by BET method when the particles are assumed to be completely spherical and have a uniform particle size, the particle size can be calculated by the equation (3) below.

$$\text{Mean particle size (nm)} = 6/(S \times d \times 1000) \quad (3)$$

wherein S; specific surface area (m$^2$/g), d; density (g/cm$^3$), d=5.24 (g/cm$^3$) for titanium nitride, d=4.3 (g/cm$^3$) for titanium nitride oxide.

In cases where the specific surface area is small, in other words, a diameter of the particle is large, it is difficult to disperse the particle finely. Hence, problems arise in that the particles precipitate during storage, the flatness decreases when used as a resin black matrix, and the adhesion with a glass decreases. On the other hand, in cases where the specific surface area is large, in other words, a diameter of the particle is small, the particles are easily aggregated when dispersed. Hence, problems arise in that dispersion stability is prone to be deteriorated when the particle is dispersed and adequate hiding power may not be attained as a light shielding agent leading to decrease in the OD value, so that the large specific surface area is not preferred.

For synthesizing the titanium nitride, gas-phase reaction method is generally employed. Examples thereof include electric furnace process and thermal plasma method. Thermal plasma method is preferred. This is because the method causes less contamination of impurities and allows synthesis of particles with a uniform size and shows high productivity. Methods for generating the thermal plasma include DC (direct-current) arc-discharge, multiple-phase arc-discharge, high-frequency (RF) plasma, and hybrid plasma. More preferred is the high frequency plasma which has less contamination of impurities from an electrode. Concrete examples of methods for producing titanium nitride compound particles by thermal plasma method include, but not limited to, a method of reacting the titanium tetrachloride and ammonium gas in a plasma flame (Japanese Laid-open Patent Application (Kokai) No. 2-22110), a method of vaporizing titanium powders with high frequency heat plasma and nitriding with nitrogen introduced as a carrier gas in a cooling process (Japanese Laid-open Patent Application (Kokai) No. 61-11140), and a method of passing ammonium gas through the peripheral portion of the plasma (Japanese Laid-open Patent Application (Kokai) No. 63-85007). Any production method may be employed as long as it produces the titanium nitride compound particles having desired properties. Various types of the titanium nitride compound particles are commercially available. A plurality of the titanium nitride compound particles satisfying the above-described angle of diffraction and the above-described amount of oxygen atoms defined in the present invention and, in addition, the above-described preferred particle size and specific surface area are also commercially available. Such commercially available products may be preferably used in the present invention.

In the preset invention, a part of the titanium nitride compound may be replaced with other pigment(s) to the extent that the OD value is not decreased for adjusting chromaticity. As the pigment other than the titanium nitride compound, black organic pigments, color mixing organic pigments, inorganic pigments and the like can be used. Examples of the black organic pigment include carbon black, resin coated carbon black, perylene black, and aniline black. Examples of the color mixing organic pigment is pseudo black which is a mixture of at least two types of pigments selected from red, blue, green, violet, yellow, magenta, cyanogens and the like. Examples of the inorganic pigment include graphite; and particles, oxides, composite oxides, sulfides and nitrides of metals such as titanium, copper, iron, manganese, cobalt, chromium, nickel, zinc, calcium and silver. The pigments may be used individually or two or more of them may be used in combination. In particular, using the carbon black enables to minimize the decrease of the OD value of the black coated film and to adjust resistance value, chromaticity and the like of the black coated film. That is, because the titanium nitride compound particles have a high resistance while the carbon black has a low resistance, the resistance value of the black coated film can be controlled by the mixing ratio of these. Moreover, using the one with surface treatment as the carbon black expands the range where the resistance value of the black coated film is controlled. Meanwhile, as for chromaticity, although it depends on crystallite diameter of the titanium nitride compound particles to be used, generally speaking, the transmissive color of the titanium nitride compound particles is blue whereas the transmissive color of the carbon black is red and mixing both results in black without coloration (neutral black). In cases where carbon black is used, the content thereof can be appropriately selected and is not restricted and is usually about 5 to 75% by weight based on the weight of the titanium nitride compound particles.

As the resin to be used in the present invention, either photosensitive or non-photosensitive resins may be employed. Specifically, epoxy resins, acrylic resins, siloxane polymer-based resins, polyimide resins, and the like may be preferably employed. In particular, because the acrylic resins and polyimide resins are excellent in heat resistance of the coated film, shelf stability of the black resin composition and so on, they are preferably employed.

The polyimide resins are, in most cases, used as non-photosensitive resins, and are formed by ring closure imidization by heat of the precursor poly(amic-acid). Poly(amic-acid) is usually obtained by an addition polymerization reaction between a compound having an anhydride group and a diamine compound at a temperature range from 40 to 100° C. The poly(amic-acid) is usually shown by the repeating unit having the structure represented by the Formula (4) below. The structure of the polyimide precursor has the amic acid structure shown in the Formula (5), and both of the imide structures with partial ring closure imidization shown in the Formula (6) and with complete ring closure imidization shown in the Formula (7).

Formula (4)

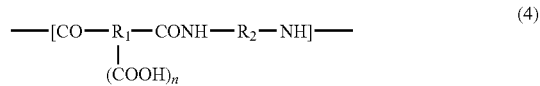

Formula (5)

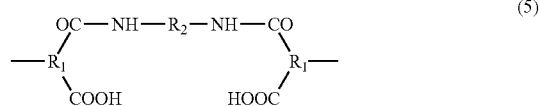

Formula (6)

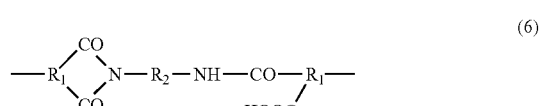

Formula (7)

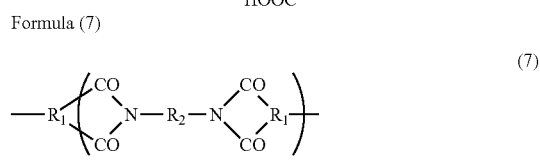

In the above general formula (4) to (7), $R_1$ represents a $C_2$-$C_{22}$ trivalent or tetravalent organic group; $R_2$ represents a $C_1$-$C_{22}$ divalent organic group; and n represents 1 or 2.

Since a resin for black matrix obtained by imidization of the polyimide precursor is required to have heat resistance and insulation properties, generally aromatic diamine and/or dianhydride are/is preferably used as the polyimide precursor.

Examples of the aromatic diamine include the following: p-phenylenediamine, m-phenylenediamine, 3,3'-diaminodiphenylether, 4,4'-diaminodiphenylether, 3,4'-diaminodiphenylether, 4,4'-diaminodiphenylmethane, 3,3'-diaminodiphenylsulfone, 4,4'-diaminodiphenylsulfone, 3,3'-diaminodiphenyl sulfide, 4,4'-diaminodiphenyl sulfide, 1,3-bis(4-aminophenoxy)benzene, 1,4-bis(4-aminophenoxy)benzene, 2,2-bis(trifluoromethyl)benzidine, 9,9'-bis(4-aminophenyl)fluorene 4,4'-diaminodiphenylamine, 3,4'-diaminodiphenylamine, 3,3'-diaminodiphenylamine, 2,4'-diaminodiphenylamine, 4,4'-diaminodibenzylamine, 2,2'-diaminodibenzylamine, 3,4'-diaminodibenzylamine, 3,3'-diaminodibenzylamine, N,N'-bis-(4-amino-3-methyl phenyl)ethylenediamine, 4,4'-diaminobenzanilide, 3,4'-diaminobenzanilide, 3,3'-diaminobenzanilide, 4,3'-diaminobenzanilide, 2,4'-diaminobenzanilide, N,N'-p-phenylene bis-p-aminobenzamide, N,N'-p-phenylene bis-m-aminobenzamide, N,N'-m-phenylene bis-p-aminobenzamide, N,N'-m-phenylene bis-m-aminobenzamide, N,N'-dimethyl-N,N'-p-phenylene bis-p-aminobenzamide, N,N'-dimethyl-N,N'-p-phenylene bis-m-aminobenzamide, N,N'-diphenyl-N,N'-p-phenylene bis-p-aminobenzamide and N,N'-diphenyl-N,N'-p-phenylene bis-m-aminobenzamide. These aromatic diamines may be used individually, or two or more of them may be used in combination. More preferably, at least a part of the diamine components is preferably a mixture of two or more selected from p-phenylenediamine, m-phenylenediamine, 3,3'-diaminodiphenylether, 4,4'-diaminodiphenylether, 3,4'-diaminodiphenylether, 3,3'-diaminodiphenylsulfone, 4,4'-diaminodiphenylsulfone, 9,9'-bis(4-aminophenyl)fluorene, and 4,4'-diaminobenzanilide Meanwhile, examples of the aromatic tetracarboxylic acid include 4,4'-oxydiphthalic dianhydride, 3,3',4,4'-benzophenone tetracarboxylic dianhydride, pyromellitic dianhydride, 3,4,9,10-perylene tetracarboxylic dianhydride, 3,3',4,4'-diphenylsulfone tetracarboxylic dianhydride, 3,3',4,4'-biphenyl tetracarboxylic dianhydride, 1,2,5,6-naphthalene tetracarboxylic dianhydride, 3,3',4,4'-paraterphenyltetracarboxylic dianhydride and 3,3',4,4'-metaterphenyltetracarboxylic dianhydride. More preferred examples include 4,4'-biphenyl tetracarboxylic dianhydride, 4,4'-benzophenone tetracarboxylic dianhydride and pyromellitic dianhydride. A polyimide precursor composition which can be converted into a polyimide with an excellent transparency in the shorter wavelength region can be obtained by using a fluorine-containing tetracarboxylic dianhydride. Specific preferred examples include 4,4'-(hexafluoroisopropylidene)diphthalic dianhydride and the like. These aromatic tetracarboxylic dianhydrides may be used individually, or two or more of them may be used in combination.

Further, if necessary, an acid anhydride such as maleic anhydride and phthalic anhydride may be added as a terminal sealant To improve adhesion to an inorganic substance such as a glass plate and silicon wafer, Si-containing anhydride and/or diamine are/is preferably used in addition to the aromatic compounds. In particular, a siloxane diamine typified by bis-3-(aminopropyl)tetramethyl siloxane can make adhesion to an inorganic substrate better. The siloxane diamine is usually used in an amount of 1 to 20% (by mole) of all diamines. When the amount of the siloxane diamine is too small, the effect to improve adhesion is not exhibited whereas the amount of siloxane diamine is too large, problems arise in that heat resistance decreases, and the film are left on the substrate because of failed alkaline development caused by too strong adhesion of a dry coated film to the substrate upon photolithography process.

To improve optical properties such as low birefringence using an alicyclic compound as a part of the dianhydride and/or diamine does not hamper the present invention by any means. A known alicyclic compound may be employed. Specific examples thereof include 1,2,4,5-cyclohexane tetracarboxylic dianhydride, bicyclo[2.2.2]oct-7-ene-2,3,5,6-tetracarboxylic dianhydride, bicyclo[2.2.1]heptane-2-endo-3-endo-5-exo-6-exo-2,3,5,6-tetracarboxylic dianhydride, bicyclo[2.2.1]heptane-2-exo-3-exo-5-exo-6-exo-2,3,5,6-tetracarboxylic dianhydride, bicyclo[2.2.1]heptane-2,3,5,6-tetracarboxylic dianhydride, decahydro-dimethanonaphthalene tetracarboxylic dianhydride, bis[2-(3-aminopropoxy)ethyl]ether, 1,4-butanediol bis(3-aminopropyl)ether, 3,9-bis(3-aminopropyl)-2,4,8,10-tetraspiro-5,5-undecane, 1,2-bis(2-aminoethoxy)ethane, 1,2-bis(3-aminopropoxy)ethane, triethylene glycol-bis(3-aminopropyl)ether, polyethylene glycol-bis(3-aminopropyl)ether, 3,9-bis(3-aminopropyl)-2,4,8,10-tetraspiro-5,5-undecane, and 1,4-butanediol bis(3-aminopropyl)ether.

Synthesis of the polyimide precursor is generally carried out by reacting tetracarboxylic dianhydride and diamine in a polar organic solvent. At that time, the degree of polymerization of the obtained poly(amic acid) can be adjusted by a mixing ratio between the tetracarboxylic dianhydride and diamine. As the solvent, an amide polar solvent such as N-methyl-2-pyrrolidone, N,N-dimethylacetamide or N,N-dimethylformamide is used. Besides, a solvent containing a lactone(s) as a primary component or a solvent composed of a lactone(s) alone is also preferred in order to enhance the dispersion effect of the pigment which is the light shielding agent. The solvent containing a lactone(s) as the principal component herein refers to a mixed solvent in which the weight ratio of the total amount of the lactones solvent is the largest in all solvents. Lactones refer to a compound having the carbon number in range from 3 to 12, which is an aliphatic cyclic ester. Specific examples thereof include, but not limited to, β-propiolactone, γ-butyrolactone, γ-valerolactone, δ-valerolactone, γ-caprolactone and ε-caprolactone. In particular, γ-butyrolactone is preferred in view of the solubility of the polyimide precursor.

As for a solvent other than lactones, examples thereof, besides the above-described polar solvents, include, but not limited to, 3-methyl-3-methoxybutanol, 3-methyl-3-methoxybutyl acetate, propylene glycol-monomethyl ether, propylene glycol-monomethyl ether acetate, dipropylene glycol-monomethyl ether, tripropyrene glycol-monomethyl ether, propylene glycol-monotertiary-butyl ether, isobutyl alcohol, isoamyl alcohol, ethyl cellosolve, ethyl cellosolve acetate, butyl cellosolve, butyl cellosolve acetate, methyl carbitol, methyl carbitol acetate, ethyl carbitol, and ethyl carbitol acetate.

In most cases, acrylic resins are used in photosensitive resin compositions.

In that case, the photosensitive resin composition comprises at least an acrylic resin, photo polymerizable monomer and photoinitiator. As for a ratio among these, usually, the weight composition ratio of the acrylic resin to the photo polymerizable monomer is 10/90 to 90/10, and the amount of the photoinitiator added is about 1 to 20% by weight based on the total weight of the polymers and monomers.

An acrylic polymer having a carboxyl group is preferably used as the acrylic polymer. A copolymer between an unsaturated carboxylic acid and ethylenically unsaturated compound may preferably be used as the acrylic polymer having a carboxyl group. Examples of the unsaturated carboxylic acid include acrylic acid, methacrylic acid, itaconic acid crotonic acid, maleic acid, fumaric acid, and vinyl acetic acid.

These may be used individually or may be also used with other copolymerizable ethylenically unsaturated compound in combination. Specific examples of copolymerizable ethylenically unsaturated compound include, but not limited to, unsaturated carboxylic acid alkyl ester such as methyl acrylate, methyl methacrylate, ethyl acrylate, ethyl methacrylate, n-propyl acrylate, isopropyl acrylate, n-propyl methacrylate, isopropyl methacrylate, n-butyl acrylate, n-butyl methacrylate, sec-butyl acrylate, sec-butyl methacrylate, isobutyl acrylate, iso-butyl methacrylate, tert-butyl acrylate, tert-butyl methacrylate, n-pentyl acrylate, n-pentyl methacrylate, 2-hydroxyethyl acrylate, 2-hydroxyethyl methacrylate, benzyl acrylate and benzyl methacrylate; aromatic vinyl compounds such as styrene, p-methylstyrene, o-methylstyrene, m-methylstyrene and α-methylstyrene; unsaturated carboxylic acid aminoalkyl esters such as aminoethylacrylate; unsaturated carboxylic acid glycidyl esters such as glycidyl acrylate and glycidyl methacrylate; carboxylic acid vinyl esters such as vinyl acetate and vinyl propionate; vinyl cyanide compounds such as acrylonitrile, methacrylonitrile and α-chloroacrylonitrile; aliphatic conjugated dienes such as 1,3-butadiene and isoprene; and polystyrene, polymethylacrylate, polymethylmethacrylate, polybutylacrylate and polybutylmethacrylate, each of which has an acryloyl group or methacryloyl group in the terminus. Especially, in view of the solubility of the polymer in an alkaline developing solution, preferred are binary to quarternary copolymers of those selected from methacrylic acid, acrylic acid, methyl methacrylate, 2-hydroxyethyl methacrylate, benzyl methacrylate and styrene, the copolymer having an average molecular weight Mw of 2000 to 100,000 and an acid value of 70-150 (mgKOH/g). If the values are outside these ranges, such a polymer is not preferred because a rate of dissolving into an alkaline developing solution decreases or is too fast.

Use of an acrylic polymer having an ethylenically unsaturated group in the side chain leads better sensitivity in exposure and development, and thus the acrylic polymer having the ethylenically unsaturated group in the side chain is preferably used. Acrylic group and methacrylate group are preferred as the ethylenically unsaturated group. Such an acrylic polymer can be obtained by an addition reaction between the carboxyl group of an acrylic (co)polymer having a carboxyl group and an ethylenically unsaturated compound having a glycidyl group or alicyclic epoxy group.

Specific examples of the acrylic polymer having the ethylenically unsaturated group in the side chain include a copolymer described in Japanese Patent No. 3120476 or Japanese Laid-open Patent Application (Kokai) No. 8-262221, and a photo-curing resin "Cyclomer (registered trademark) P" (Daicel Chemical Industries, Ltd.), which is a commercially available acrylic polymer, and an alkali-soluble cardo resin. In particular, among the acrylic polymers having the ethylenically unsaturated group in the side chain, a polymer having an average molecular weight (Mw) of 2000 to 100,000 (measured using tetrahydrofuran as a carrier by gel permeation chromatography and calculated using a calibration curve of a standard polystyrene) and an acid value of 70 to 150 (mgKOH/g) is most preferable in view of the photosensitive properties, solubility in ester solvents, and solubility in alkaline development solutions.

As the monomer, a multifunctional or monofunctional acrylic monomer or oligomer can be used. Examples of the multifunctional monomer include bisphenol A diglycidyl ether (meth)acrylate, poly(meth)acrylatecarbamate, denatured bisphenol A epoxy(meth)acrylate, adipic acid 1,6-hexanediol (meth)acrylic ester, phthalic anhydride propylene oxide (meth)acrylic ester, trimellitic acid diethylene glycol (meth)acrylic ester, rosin-modified epoxydi(meth)acrylate, alkyd-modified (meth)acrylate, fluorene diacrylate-based oligomers described in Japanese Patent No. 3621533 or Japanese Laid-open Patent Application (Kokai) No. 8-278630, tripropylene glycol di(meth)acrylate, 1,6-hexane diol di(meth)acrylate, bisphenol A diglycidyl eter di(meth)acrylate, trimethylolpropane tri(meth)acrylate, penta erythritol tri(meth)acrylate, triacrylformal, pentaerythritol tetra(meth)acrylate, dipenta erythritolhexa(meth)acrylate, dipenta erythritolpenta(meth)acrylate, 2,2-bis[4-(3-acryloxy-2-hydroxy propoxy)phenyl]propane, bis[4-(3-acryloxy-2-hydroxy propoxy)phenyl]methane, bis[4-(3-acryloxy-2-hydroxy propoxy)phenyl]sulfone, bis[4-(3-acryloxy-2-hydroxy propoxy)phenyl]ether, 4,4'-bis[4-(3-acryloxy-2-hydroxy propoxy)phenyl]cyclohexane, 9,9-bis[4-(3-acryloxy-2-hydroxy propoxy)phenyl]fluorene, 9,9-bis[3-methyl-4-(3-acryloxy-2-hydroxy propoxy)phenyl]fluorene, 9,9-bis[3-chloro-4-(3-acryloxy-2-hydroxy propoxy)phenyl]fluorene, bisphenoxyethanol fluorene diacrylate, bis phenoxyethanol fluorene dimethacrylate, biscresol fluorene diacrylate, and biscresol fluorene dimethacrylate. These may be used individually or in combination.

Sensitivity and workability of the resist can be controlled by selection and combination of these multifunctional monomers and oligomers. In particular, in order to increase the sensitivity, use of a compound having not less than three functional groups, more preferably not less than five functional groups, is preferred. In particular, dipentaerythritol hexa(meth)acrylate and dipentaerythritol penta(meth)acrylate are preferred. In cases where a pigment which absorbs ultraviolet rays effective in photo-crosslinking is used as in resin BM, in addition to dipentaerythritol hexa(meth)acrylate and dipentaerythritol penta(meth)acrylate, concomitant use of a (meth)acrylate containing a number of aromatic rings and having a high water-repelling fluorene ring in the molecule is more preferred because the pattern can be controlled to a desired shape upon development. Use of, as a monomer, a mixture of dipentaerythritol hexa(meth)acrylate and/or dipentaerythritol penta(meth)acrylate in an amount of 10 to 60 parts by weight and a (meth)acrylate having a fluorene ring in an amount of 90 to 40 parts by weight is preferred.

The photoinitiator is not restricted and a known photoinitiator such as benzophenone-based compound, acetophenone-based compound, oxanton-based compound, imidazole-based compound, benzothiazole-based compound, benzo oxazole-based compound, oxime ester compound, carbazole-based compound or triazine-based compound; or an inorganic photoinitiator such as a phosphorus-containing compound or a titanate may be employed. Examples thereof include benzophenone, N,N'-tetraethyl-4,4'-diaminobenzophenone, 4-methoxy-4'-dimethylaminobenzophenone, 2,2-diethoxyacetophenone, benzoin, benzoin methyl ether, benzoin isobutyl ether, benzyldimethyl ketal, α-hydroxyisobutylphenone, thioxanthone, 2-chlorothioxanthone, 1-hydroxycyclohexylphenyl ketone, 2-methyl-1-[4-(methylthio)phenyl]-2-morpholino 1-propane, 2-benzyl-2-dimethylaminol-(4-morpholinophenyl)-butanone which is Ciba Specialty Chemicals K. K. "Irgacure (registered trademark)" 369, 2-[4-methylbenzyl]-2-dimethylamino-1-(4-morpholinophenyl)-butanone which is Ciba Specialty Chemicals K. K. CGI-113, t-butyl anthraquinone, 1-chloro anthraquinone, 2,3-dichloro anthraquinone, 3-chloro-2-methyl anthraquinone, 2-ethyl anthraquinone, 1,4-naphthoquinone, 9,10-phenanthraquinone, 1,2-benzo anthraquinone, 1,4-dimethyl anthraquinone, 2-phenyl anthraquinone, 2-(o-chloro phenyl)-4,5-diphenyl imidazole dimer, 2-mercaptobenzothiazole, 2-mercapto benzo oxazole, 1,2-octanedion, 1-[4-(phenyl thio)-2-(O-benzoyl oxime)] which is Ciba Specialty Chemicals K. K. "Irgacure (registered trademark)" OXE01, ethanone, 1-[9-ethyl-6-(2-methyl benzoyl)-9H-carbazole-3-yl]-, 1-(O-acetyl oxime) which is Ciba Specialty Chemicals K. K. CGI-242, 4-(p-methoxyphenyl)-2,6-di-(trichloro methyl)-s-triazine, "Adeka (registered trademark) optomer" N-1818 and N-1919 which are carbazole-based compounds manufactured by Asahi Denka Kogyo K.K. Two or more types of these photoinitiators can be used in combination, In particular, use of a combination of three types of photoinitiators, that is, N,N'-tetraethyl-4,4'-diaminobenzophenone; Ciba Specialty Chemicals K. K. "Irgacure (registered trademark)" 369 or Ciba Specialty Chemicals K. K. CGI-113; and a carbazole-based compound such as Asahi Denka Kogyo K.K. Adeka (registered trademark) optomer" N-1818 or N-1919 or Ciba Specialty Chemicals K. K. CGI-242 is preferred because a photosensitive resin composition having high sensitivity and an excellent property of pattern shape can be attained.

Even in cases where either the polyimide resin or the acrylic resin is used, an adhesion promoter may be added for the purpose of improving adhesion to an inorganic substance such as a glass plate or silicon wafer. As the adhesion promoter, a silane coupling agent and a titanium coupling agent can be used. The amount of the adhesion promoter to be added is usually about 0.2 to 20% by weight based on the weight of the polyimide resin or acrylic resin.

In the black composition according to the present invention, for the purpose of improving the dispersion stability of the light shielding agent, a polymeric dispersant can be added. As the polymeric dispersant, polyethyleneimine-based polymeric dispersant, polyurethane-based polymeric dispersant, polyallylamine-based polymeric dispersant or the like can be preferably used. Such a polymeric dispersant is preferably added to the extent that the photosensitivity and adhesion do not decrease. The amount of the polymeric dispersant to be added is usually about 1 to 40% by weight based on the light shielding agent.

In the black composition according to the present invention, the weight ratio of the light shielding agent/resin component is preferably within the range between 75/25 and 40/60 in order to obtain a black coated film having a high resistance and a high OD value. The weight ratio of light shielding agent/resin component is more preferably within the range between 75/25 and 60/40 in view of the balance among adhesion, ease of patterning and the OD value. The resin component herein refers to the total of the polymer, monomer or oligomer and the polymeric disparant. If the amount of the resin component is too small, adhesion to the substrate of the black coated film are deteriorated. On the other hand, if the amount of the light shielding agent is too small, the OD value per thickness (OD value/μm) decreases, either of which is problematic.

The solvent used in the black resin composition according to the present invention is not restricted. Water and organic solvents can be used depending on the dispersion stability of the pigment to be dispersed and the solubility of the resin to be added. The organic solvent is not restricted, and esters, fatty alcohols, (poly)alkylene glycol ether-based solvents, ketones, amide polar solvents, lactone polar solvents or the like can be used. These solvents may be used individually or two or more of them may also be preferably used. A mixture with a solvent other than these may also be preferably used.

As mentioned above, as the resin according to the present invention, use of the polyimide-based resin or acrylic-based resin is particularly preferred. Accordingly, as the solvent, use of a solvent that dissolves these resins is preferred. Specifically, in particular when the resin is polyimide-based, a solvent that dissolves its precursor, poly(amic acid)s, including amide polar solvents such as N-methyl-2-pyrrolidone (boiling point 202° C.), N,N-dimethylacetamide (boiling point 165° C.) and N,N-dimethylformamide (boiling point 153° C.); lactones such as β propiolactone (boiling point 155° C.), γ-butyrolactone (boiling point 204° C.), γ-valerolactone (boiling point 207° C.), δ-valerolactone (boiling point 58° C.), γ-caprolactone (boiling point 100° C.) and ε-caprolactone (boiling point 96° C.) can be preferably used.

Specific examples of the esters include, but not limited to, benzyl acetate (boiling point 214° C.), ethyl benzoate (boiling point 213° C.), methyl benzoate (boiling point 200° C.), diethyl malonate (boiling point 199° C.), 2-ethylhexyl acetate (boiling point 199° C.), 2-butoxyethyl acetate (boiling point 192° C.), 3-methoxy-3-methyl-butyl acetate (boiling point 188° C.), diethyl oxalate (boiling point 185° C.), ethyl acetoacetate (boiling point 181° C.), cyclohexyl acetate (boiling point 174° C.), 3-methoxy-butyl acetate (boiling point 173° C.), methyl acetoacetate (boiling point 172° C.), ethyl-3-ethoxy propionate (boiling point 170° C.), 2-ethylbutyl acetate (boiling point 162° C.), isopentyl propionate (boiling point 160° C.), propylene glycol monomethyl ether propionate (boiling point 160° C.), propylene glycol monomethyl ether acetate (boiling point 158° C.), pentyl acetate (boiling point 150° C.), and propylene glycol monomethyl ether acetate (boiling point 146° C.).

As a solvent other than the above-described ones, (poly)alkylene glycol ether-based solvents such as ethylene glycol monomethyl ether (boiling point 124° C.), ethylene glycol monoethyl ether (boiling point 135° C.), propylene glycol monoethyl ether (boiling point 133° C.), diethylene glycol monomethyl ether (boiling point 193° C.), monoethyl ether (boiling point 135° C.), methyl carbitol (boiling point 194° C.), ethyl carbitol (202° C.), propylene glycol monomethyl ether (boiling point 120° C.), propylene glycol monoethyl ether (boiling point 133° C.), propylene glycol tertiary butyl ether (boiling point 153° C.) and dipropylene glycol monomethyl ether (boiling point 188° C.); fatty acid esters other than the above, including ethyl acetate (boiling point 77° C.), butyl acetate (boiling point 126° C.), isopentyl acetate (boiling point 142° C.); aliphatic alcohols such as butanol (boiling point 118° C.), 3-methyl-2-butanol (boiling point 112° C.), 3-methyl-3-methoxybutanol (boiling point 174° C.); ketones such as cyclopentanone and cyclohexanone; solvents such as xylene (boiling point 144° C.), ethylbenzene (boiling point 136° C.) and solvent naphtha (petroleum fraction: boiling point 165 to 178° C.) can also be used additionally.

Further, as the substrate increases in size, coating with a die coating apparatus is becoming the main trend, so that the solvent preferably comprises two or more solvents in order to achieve an appropriate volatility and drying property. In cases where the boiling points of all solvents constituting the mixed solvent are not higher than 150° C., many problems arise in that uniformity of film thickness cannot be attained; the film thickness in the coating finishing area increases; the pigments are aggregated at a nozzle part from where the coating solution is ejected through a slit so that streaking occurs in the coated film. On the other hand, in cases where the mixed solvent contains many solvents having a boiling point of not lower than 200° C. the coated film surface is adhesive to generate sticking. Hence a mixed solvent containing 30 to 75% by mass of a solvent having the boiling point in the range between 150 and 200° C. is preferred.

To the black resin composition according to the present invention, for the purpose of attaining good coating performance and smoothness of colored coated film, and preventing Benard Cells, a surfactant can be added. The amount of the surfactant to be added is usually 0.001 to 10% by mass, preferably, 0.01 to 1% by mass based on the pigments. If the amount added is too small, the effects for attaining good coating performance and smoothness of colored coated film, and preventing Benard Cells cannot be obtained whereas the amount added is too large, physical properties of the coated film, on the contrary, may be deteriorated in some cases. Specific examples of the surfactant include anionic surfactants such as ammonium lauryl sulfate and polyoxyethylene alkyl ether sulfate triethanolamine; cationic surfactants such as stearylamine acetate and lauryltrimethyl ammonium chloride; amphoteric surfactants such as lauryldimethyl amine oxide and laurylcarboxy methyl hydroxy ethylimidazolium-betaine; nonionic surfactants such as polyoxyethylene lauryl ether, polyoxyethylene stearyl ether and sorbitan monostearate; silicone-based surfactants having polydimethylsiloxane or the like as the main skeleton; and fluorine-containing surfactants. In the present invention, the surfactants can be used individually or two or more of them may be used in combination, which surfactants are not restricted to those described above.

In the black resin composition according to the present invention, the solid concentration, that is, the total concentration of the resin component (including monomers and oligomers, and additives such as photoinitiator) and the light shielding agent, is preferably not less than 2% and not more than 30%, more preferably not less than 5% and not more than 20% from the viewpoint of the coating performance and drying property. Accordingly, the black composition according to the present invention preferably consists essentially of the solvent, resin component, and light shielding agent, wherein the total amount of the resin component and light shielding agent is preferably not less than 2% and not more than 30%, more preferably not less than 5% and not more than 20%, and the balance is the solvent. As described above, the surfactant may be further included in the above-described concentration.

The black resin composition according to the present invention is produced by a method such as a method wherein the pigments are directly dispersed in the resin solution using a disperser, or a method wherein the pigments are dispersed in water or organic solvent using the disperser to produce a pigment dispersion followed by mixing with the resin solution. The method of dispersing the pigments is not restricted and may be various methods including those using ball mill, sand grinder, triple roll mill, and high speed impact mill. In view of dispersion efficiency and finely dispersing performance, using the bead mill is preferred. As the bead mill, co-ball mill, basket mill, pin mill, DYNO mill and the like can be employed. As the beads for the bead mill, titania bead, zirconia bead, and zircon bead are preferred. The diameter of the bead used for dispersion is preferably not less than 0.01 mm and not more than 5.0 mm, more preferably not less than 0.03 mm and not more than 1.0 mm. In cases where the diameter of the primary particles and the diameter of the secondary particles formed by aggregation of the primary particles are small, finer dispersion beads having a particle size of not less than 0.03 mm and not more than 0.10 mm are preferably used. In this case, it is preferred that dispersion be carried out by using a bead mill having a separator capable of separating the fine beads from the dispersed solution in a centrifugation fashion. On the other hand, in cases where pigments containing larger submicron particles are dispersed, dispersion beads with a diameter of not less than 0.10 mm is preferred, so that sufficient grinding strength can be attained to disperse the pigments finely.

Examples of the method for preparing the resin black matrix according to the present invention will be described below.

As the method for coating of the black resin composition on a substrate, various methods including methods wherein the composition is coated on the substrate by dip method, roll coater method, spinner method, die coating method, or method by a wire bar; methods wherein the substrate is immersed in the solution; and methods wherein the solution is sprayed the solution on the substrates, may be employed. The substrate is not restricted and inorganic glasses such as quartz silica glass, borosilicate glass, aluminosilicate glass, soda lime glass with silica coating on surface thereof, organic plastic film or organic plastic sheet, and the like are preferably used. In case of coating on the substrate, treatment with an adhesive promoter such as silane coupling agent, aluminum chelating agent, and titanium chelating agent on the surface of the substrate can improve adhesion between the black matrix film and substrate.

After coating the black resin composition on a transparent substrate by the above-described method, the resultant is dried under heat and cured by air-drying, drying under heat, vacuum evaporation or the like to form a dried coated film. In order to prevent dried unevenness or convey unevenness while forming the coated film, the substrate coated with the coating composition is preferably heated and cured after dried under reduced pressure with a reduced pressure drying apparatus equipped with a heater.

The thus obtained coated film is patterned usually using photolithography or the like. That is, the coated film is then exposed and developed into a desired pattern after forming a coating photoresist film thereon in cases where the resin is a non-photosensitive resin, or as it is or after forming an oxygen-impermeable film thereon in cases where the resin is a photosensitive resin. Thereafter, as required, the photoresist or the oxygen-impermeable film is removed, and then the coating composition is cured by heating, thereby obtaining the resin black matrix. Although the heat curing conditions vary depending on the resin, in cases where a polyimide-based resin is obtained from a polyimide precursor, the heat treatment is usually carried out at 200 to 350° C. for 1 minute to 60 minutes.

The film thickness of the resin black matrix obtained from the black resin composition according to the present invention is not restricted as long as it is within the range within which the obtained black matrix is usable as the black matrix.

The optical density (OD value) of the resin black matrix obtained from the black resin composition according to the present invention preferably is not less than 4.0 per 1 μm of film thickness, within the visible wavelength region between 380 and 700 nm, more preferably not less than 4.5, and still more preferably not less than 5.0. The OD value is measured using a multi channel photo detector (MCPD2000 manufactured by Otsuka Electronics Co., Ltd) and calculated by the equation (8) below $$OD\ \text{Value} = \log_{10}(I_0/I) \qquad (8)$$

wherein $I_0$ represents the intensity of incident light and I represents the intensity of transmitted light.

The volume resistance ρ (Ω·cm) of the resin black matrix obtained from the black resin composition according to the present invention is preferably not less than $10^6$ (Ω·cm), more preferably not less than $10^8$ (Ω·cm). The volume resistance is measured by three-terminal method with a guard ring and can be calculated by the equation (9) below.

$$\text{Volume resistance } \rho(\Omega\cdot\text{cm}) = (V/I) \times (s/d) \qquad (9)$$

wherein V; applied voltage (V), I; flowed electric current (A), s; electrode surface ($cm^2$), d; thickness of the coated film (μm).

The adhesion strength between the resin black matrix obtained from the black resin composition according to the present invention and the substrate is preferably not less than 6.0 MPa when the contact surface area with the substrate is 5 $mm^2$, more preferably not less than 8.0 MPa. If the adhesion strength with substrate is smaller than 6.0 MPa, a problem arises in that the resin black matrix peels off out of the glass.

In the present invention, a color filter for liquid crystal displays may be produced using the resin black matrix described above. That is, the present invention also provides a color filter comprising the above-described resin black matrix according to the present invention. The color filter comprises at least the transparent substrate, the resin black matrix formed on a partial region of the transparent substrate, and pixels formed in a region on the transparent substrate where the resin black matrix is not formed, which resin black matrix is the above-described resin black matrix according to the present invention.

In case of using the resin black matrix according to the present invention in the production of the color filter for liquid crystal displays, the black matrix is formed on a transparent substrate, then the pixels having the color selectivity of red (R), green (G) and blue (B), are formed, and then an over-coat is formed thereon as required, as described in Japanese Patent Publication (Kokoku) No. 2-1311. Concrete materials of the pixels include inorganic films whose film thickness is so controlled as to allow transmission of an specified light alone, and colored resin films which are dyed or in which a dye or pigment is dispersed. The order of forming the pixels can be optionally changed as required. Further, after forming the color layers of three primary colors or after forming the over-coat film on the color layers of three primary colors, a transparent conductive coating can be formed as required. As the transparent electrode, an oxide thin film such as ITO is employed. Usually, ITO film with a thickness of about 0.1 μm is formed by sputtering or vacuum deposition.

Although the pigments which are used for the pixels of the color filter according to the present invention are not restricted, pigments having excellent light resistance, heat resistance and chemical resistance are desired. Specific examples of representative pigments, which are referred by their Color Index (CI) number, include, but not limited to, the following.

Examples of the red pigment include pigment red (hereinafter referred to as "PR" for short) 9, PR48, PR97, PR122, PR123, PR144, PR149, PR166, PR168, PR177, PR179, PR180, PR190, PR192, PR209, PR215, PR216, PR217, PR220, PR223, PR224, PR226, PR227, PR228, PR240, PR254 and the like.

Examples of the orange pigment include pigment orange (hereinafter referred to as "PO" for short) 13, PO31, PO36, PO38, PO40, PO42, PO43, PO51, PO55, PO59, PO61, PO64, PO65, PO71 and the like.

Examples of the yellow pigment include pigment yellow (hereinafter referred to as "PY" for short) PY12, PY13, PY14, PY17, PY20, PY24, PY83, PY86, PY93, PY94, PY95, PY109, PY110, PY117, PY125, PY129, PY137, PY138, PY139, PY147, PY148, PY150, PY153, PY154, PY166, PY168, PY173, PY180, PY185, and the like. Examples of the violet pigment include pigment violet (hereinafter referred to as "PV" for short) 19, PV23, PV29, PV30, PV32, PV36, PV37, PV38, PV40, PV50, and the like.

Examples of the blue pigment include pigment blue (hereinafter referred to as "PB" for short) 15, PB15:3, PB15:4, PB15:6, PB22, PB60, PB64, and the like are used.

Examples of the green pigment include pigment green (hereinafter referred to as "PG" for short) 7, PG10, PG36, and the like.

These pigments may be, as required, subjected to a surface treatment such as rosin treatment, acidic group treatment or basic treatment, and a pigment derivative can be used as a dispersing agent.

Although the matrix resin used in the pixel of the color filter according to the present invention is not restricted, acrylic resins, polyvinyl alcohols, polyamide, polyimide or the like can be used. From the viewpoint of simplicity of the production process, heat resistance, light resistance and the like, it is preferred to use resin films in which the pigments are dispersed. From the viewpoint of ease of forming patterns, it is preferred to use a photosensitive acrylic resin in which the pigments are dispersed. Yet, from the viewpoint of heat resistance and chemical resistance, it is preferred to use a polyimide resin in which the pigments are dispersed.

In the substrate color filter for the liquid crystal displays according to the present invention, the black matrix is arranged between the pixels. The black matrix is also arranged in the frame portion of the pixels. Arranging the black matrix can enhance the contrast of liquid crystal display as well as can prevent the drive elements of liquid crystal display from being erroneously operated by light.

Fixed spacers may be formed on the color filter for the liquid crystal display according to the present invention. The fixed spacer refer to, as described in Japanese Laid-open Patent Application (Kokai) No. 4-318816, a spacer which is fixed in the specific position on the substrate for the liquid crystal display and contacted with the opposing substrate when the liquid crystal display is prepared. As a result, a constant gap is retained between the opposing substrates and the liquid crystals are injected into the gap. By arranging the fixed spacers, a step of dispersing a ball spacer or a step of kneading a rod-shaped spacer in an sealing agent in the manufacturing process for liquid crystal display can be omitted.

Formation of the fixed spacer is carried out by a method such as photo lithography, printing or electro-deposition. Since the spacers can be readily formed in the position as designed, the spacers are preferably formed by photolithography. The spacer may be formed in a laminate structure at the same time as the preparation of R, G, and B pixels or may be formed after the preparation of R, G, and B pixels.

In the present invention, since the resin black matrix can be formed in the form of a thin film as described above, the height of the color pixel running over onto the black matrix is lower, and thus a color filter with high flatness can be prepared without forming the over-coat film. Yet, in cases where higher flatness is required and in case where holes and bumps processed on the color pixel are flattened, as well as, for the purpose of preventing components contained in the color pixel from dissolving out into the liquid crystal layer, formation of the over-coat film is preferred. Examples of materials for the over-coat film include epoxy film, acrylic epoxy film, acrylic film, siloxane polymer-based film, polyimide film, silicon-containing polyimide film, polyimide siloxane film and the like. The over-coat film may be formed after the resin black matrix is formed, after the pixel is formed, or after the fixed spacer is arranged. With regard to the thickness of the over-coat after being cured under heating, in cases where the over-coat is coated on a substrate with irregularities, there is a tendency, due to the leveling property of the over-coat agent, that the over-coat is thicker in recess regions (regions lower than the surroundings) whereas it is thinner in protruded regions (regions higher than the surroundings). Although the thickness of the over-coat according to the present invention is not restricted, it is 0.01 to 5 μm, preferably 0.03 to 4 μm, more preferably 0.04 to 3 μm.

The present invention provides a liquid crystal display comprising the above-described color filter according to the present invention. The liquid crystal display according to the present invention comprises the above-described color-filter according to the present invention, an electrode substrate arranged facing to the color filter, liquid crystal alignment films provided respectively on the color filter and on the electrode substrate, a spacer which retains a space between these liquid crystal alignment films and a liquid crystal filled in the space.

An example of the above-mentioned liquid crystal display using the color filter will now be described. The color filter and electrode substrates are faced and laminated through a liquid crystal alignment film on the substrates, which liquid crystal alignment film was subjected to rubbing treatment for aligning the liquid crystals, and the spacer for retaining the cell gap. On the electrode substrate, thin-film transistor (TFT) elements or thin-film diode (TFD) elements, scanning lines, data lines and like may be formed to prepare a TFT liquid crystal display or TFD liquid crystal display. Then liquid crystal is injected from an injection port formed at the sealing region, and then the injection port is sealed. Then an IC driver and the like are mounted, thereby completing the liquid crystal display.

EXAMPLES

The present invention will be further described in detail below based on examples and comparative examples. However, the present invention is by no means limited to the following examples.

<Evaluation Methods>

"X-Ray Diffraction"

X-ray diffraction was measured by filling a powdered sample in an aluminum standard sample holder by the wide angle X-ray scattering method (RU-200R manufactured by Rigaku Corporation). As for the measurement conditions, CuKα line was employed as the X-ray source; 50 kV/200 mA for X-ray output; 1°-1°-0.15 mm-0.45 mm for a slit system; 0.02° for a measurement step (2θ); and 2°/minute for a scan rate.

The angle of diffraction at the peak originated from the (200) plane observed around 2θ=46° was measured. Further, from the half bandwidth originated from this (200) plane, the crystallite size constituting the particles was calculated using Scherrer's formula of the above-described equations (1) and (2).

"Specific Surface Area"

The specific surface area of the pigment was measured with high performance automatic gas adsorption apparatus ("BELSORP"36) manufactured by BEL Japan, Inc. After vacuum degassing at 100° C., the adsorption isotherm of $N_2$ gas at a temperature of liquid nitrogen (77 K) was measured and analyzed by BET method to determine the specific surface area. From the value of this specific surface area, a BET-converted particle size was determined by using the above-described equation (3). In this case, the value for titanium nitride d=5.24 (g/cm$^3$) was used for the titanium nitride compound particles as a specific gravity whereas d=4.30 (g/cm$^3$) was used for titanium nitride oxide samples as the specific gravity.

"Composition Analysis"

The content of titanium atoms was measured by ICP optical emission spectrometry (ICP optical emission spectrometer SPS3000 manufactured by Seiko Instruments Inc).

The contents of the oxygen atoms and nitrogen atoms were measured with Oxygen/Nitrogen analyzer EMGA-620W/C manufactured by HORIBA Ltd. The oxygen atoms and nitrogen atoms were determined by inert gas fusion-infrared absorption method and inert gas fusion-thermal conductivity method, respectively.

"OD Value"

The resin black matrix with a film thickness of 1.0 μm or 0.8 μm was formed on a non-alkali glass and an OD value was determined with a multi channel photo detector (manufactured by Otsuka Electronics Co. Ltd., MCPD2000) by the above-described equation (8).

"Peak Wavelength of Transmitted Light"

The resin black matrix with a film thickness of 0.6 μm was formed on a non-alkali glass and a peak wavelength was measured with a multi channel photo detector (manufactured by Otsuka Electronics Co. Ltd., MCPD2000).

"Adhesion"

The resin black matrix with a film thickness of 1.0 μm or 0.8 μm was formed on the non-alkali glass. A sealing agent with a film thickness of 7 μm was formed on the resin black matrix. A cover slip was placed on the resultant. After adhesion between the resin black matrix and the sealing agent, as well as between the sealing agent and the cover slip became sufficient, the resultant sample was subjected to a tensile test at a rate of 10 min/min with "Tensilon" (manufactured by ORIENTEC Co. Ltd., RTM-100). The adhesion was determined by the Equation (10) below from the breaking strength and the torn surface area when the resin black matrix and the glass were broken. Since a value of adhesion strength tends to be smaller as the torn surface area is larger, the value when the torn surface area was 5 mm$^2$ was set as the adhesion strength in the present invention.

$$\text{Adhesion strength (MPa)} = \text{breaking strength (kgf)} \times 9.8/\text{torn surface area (m}^2\text{)} \quad (10).$$

"Resistance Value"

Volume resistance ρ (Ω·cm) was measured with an insulating resistance tester (manufactured by Keithley Instruments Inc., 6517A). The resin black matrix with a film thickness of 1.0 μm or 0.8 μm formed on an aluminum substrate was set in a test fix chair (manufactured by Keithley Instruments Inc., 8090) and an alternation voltage of about several volts was applied. A leak current through the coated film was measured to determine the volume resistance.

"Synthesis of Poly(Amic Acid)s"

4,4'-diaminophenyl ether (0.30 molar equivalent), p-phenylenediamine (0.65 molar equivalent) and bis(3-aminopropyl)tetramethyldisiloxane (0.05 molar equivalent) were fed together with 850 g of γ-butyrolactone and 850 g of N-methyl-2-pyrrolidone. To the mixture, 3,3',4,4'-oxydiphthalcarboxylic dianhydride (0.9975 molar equivalent) was added and the mixture was allowed to react at 80° C. for three hours. Thereafter, maleic anhydride (0.02 molar equivalent) was added, and the resulting mixture was allowed to react at 80° C. for another one hour to obtain a poly(amic acid) A-1 (polymer concentration: 20% by weight).

4,4'-diaminophenyl ether (0.95 molar equivalent) and bis(3-aminopropyl)tetramethyldisiloxane (0.05 molar equivalent) were fed together with 1700 g (100%) of γ-butyrolactone. To the mixture, pyromellitic dianhydride (0.49 molar equivalent) and benzophenone tetracarboxylic dianhydride (0.50 molar equivalent) were added and the mixture was allowed to react at 80° C. for three hours. Thereafter, maleic anhydride (0.02 molar equivalent) was added, and the resulting mixture was allowed to react at 80° C. for another one hour to obtain a poly(amic acid) A-2 (polymer concentration: 20% by weight).

"Synthesis of Acrylic Polymers"

Methyl methacrylate/methacrylic acid/styrene copolymer (weight composition ratio 30/40/30) was synthesized in accordance with the method described in Example 1 in Japanese Patent No. 3120476. To the copolymer, 40 parts by weight of glycidyl methacrylate was then added, redeposited with aqua purificata followed by filtration and drying to yield an acrylic polymer (P-1) powder having an average molecular weight (Mw) of 40,000 and an acid value of 110 (mgKOH/g).

"Synthesis of Adhesion Promoters"

1,3-bis(3-aminopropyl)tetramethyldisiloxane in an amount of 4.8 g (0.1 mol), 56.9 g (0.4 mol) of glycidyl methacrylate, and 0.08 g of a polymerization terminator, hydroquinone monomethyl ether, were placed in a flask, and the mixture was allowed to react at 55° C. for four hours under stirring, followed by adding 81.7 g of propylene glycol monomethyl ether acetate. The mixture was diluted to a concentration of 50% by mass and further allowed to react at 55° C. for two hours to yield an adhesion promoter solution (AP-1).

"Synthesis of Titanium Nitride Oxide Pigments"

Titanium dioxide powder (4.0 kg) with an average of the primary particle diameter of 40 nm was placed in a reactor. By flowing ammonia gas at linear velocity inside furnace of 3 cm/sec, a reaction was carried out for 6 hours at a furnace temperature of 750° C. to yield titanium nitride oxide (Bk1, 3.2 kg).

Example 1

The angle of diffraction 2θ of the peak originated from the (200) plane of titanium nitride compound particles (sample 1, manufactured by NISSHIN ENGINEERING INC., TiN UFP Lot 13307412) prepared by thermal plasma method was 42.65°. The crystallite size determined from the half bandwidth of this peak was 17.0 nm and the BET specific surface area was 105.8 m²/g. A composition analysis revealed that the content of titanium was 69.9% by weight; the content of nitrogen was 19.1% by weight; and the content of oxygen was 9.94% by weight. No X-ray diffraction peaks originated from $TiO_2$ were observed at all.

This sample 1 (96 g), poly(amic acid) solution A-1 (120 g), γ-butyrolactone (114 g), N-methyl-2-pyrrolidone (538 g) and 3-methyl-3-methoxybutyl acetate (132 g) were fed to a tank and the mixture was stirred with a homo mixer (manufactured by Tokusyu Kika Kogyo) for a hour to yield pre-dispersion 1. Subsequently, the pre-dispersion 1 was provided in Ultra Apex Mill (manufactured by KOTOBUKI INDUSTRIES CO., LTD.) equipped with a centrifugation separator 70%-filled with zirconia beads having a diameter of 0.05 mm (manufactured by Nikkato Corporation, YTZ balls), and dispersion treatment was carried out for two hours at a revolving rate of 8 m/s to yield pigment dispersion 1 having a solid concentration of 12% by weight, and pigment/resin (weight ratio)=80/20.

To this pigment dispersion 1 (728 g), were added poly(amic acid) A-1 (63 g), γ-butyrolactone (82 g), N-methyl-2-pyrrolidone (87 g), 3-methyl-3-methoxybutyl acetate (39 g) and a surfactant LC951 (manufactured Kusumoto Chemicals, Ltd., 1 g) to yield black resin composition 1 having a total solid concentration of 10% by weight and the pigment/resin (weight ratio)=70/30.

This black resin composition 1 was coated on a non-alkali glass (manufactured by Corning Incorporated, "1737") substrate with a curtain flow coater, and vacuum-dried at 80° C., $10^{-1}$ Torr for 2 minutes. Subsequently, the resultant was semi-cured at 140° C. for 20 minutes, and a positive photoresist (manufactured by Shipley Company L.L.C, "SRC-100") was coated with a reverse roll coater, pre-baked at 120° C. for 5 minutes in a hot plate, and exposed via a photomask using an exposure apparatus "XG-5000" manufactured by DAINIPPON SCREEN MFG. CO., LTD. Development of a posi-type resist and etching of a polyimide precursor were simultaneously carried out with a tetramethylammonium hydroxide aqueous solution, and then the positive resist was peeled off with methyl cellosolve acetate. Further, the resultant was cured at 300° C. for 30 minutes, thereby preparing black matrix 1 with a thickness of 1.0 μm.

Example 2

The angle of diffraction 2θ of the peak originated from the (200) plane of titanium nitride compound particles (sample 2, manufactured by Hefei Kai'er.) prepared by thermal plasma method was 42.65°. The crystallite size determined from the half bandwidth of this peak was 16.5 nm and the BET specific surface area was 55.8 m²/g. Composition analysis revealed that the content of titanium was 69.8% by weight; the content of nitrogen was 18.6% by weight; and the content of oxygen was 9.95% by weight. No X-ray diffraction peaks originated from $TiO_2$ were observed at all.

Except that the sample 2 instead of the sample 1 was used as a pigment to be used, the same procedure as in Example 1 was carried out to obtain pigment dispersion 2 and black resin composition 2.

Using the black resin composition 2, black matrix 2 was prepared in the same manner as Example 1.

Example 3

The angle of diffraction 2θ of the peak originated from the (200) plane of titanium nitride compound particles (sample 3, manufactured by NISSHIN ENGINEERING INC., TiN UFP Lot 13406810) prepared by thermal plasma method was 42.61°. The crystallite size determined from the half bandwidth of this peak was 25.6 nm and the BET specific surface area was 45.6 m²/g. The composition analysis revealed that the content of titanium was 69.9% by weight; the content of nitrogen was 15.4% by weight; and the content of oxygen was 13.7% by weight. X-ray diffraction peaks originated from $TiO_2$ were slightly seen at 25.23° and 27.50°.

Except that the sample 3 instead of the sample 1 was used as a pigment to be used, the same procedure as in Example 1 was carried out to obtain pigment dispersion 3 and black resin composition 3.

Using the black resin composition 3, black matrix 3 was prepared in the same manner as Example 1.

Example 4

The angle of diffraction 2θ of the peak originated from the (200) plane of titanium nitride compound particles (sample 4, manufactured by NIS SHIN ENGINEERING INC., TiN UFP Lot 13307215) prepared by thermal plasma method was 42.62°. The crystallite size determined from the half bandwidth of this peak was 29.4 nm and the BET specific surface area was 36.0 m²/g. The composition analysis revealed that the content of titanium was 72.2% by weight; the content of nitrogen was 19.4% by weight; and the content of oxygen was 6.37% by weight. No X-ray diffraction peaks originated from $TiO_2$ were observed at all.

Except that the sample 4 instead of the sample 1 was used as a pigment to be used, the same procedure as in Example 1 was carried out to obtain pigment dispersion 4 and black resin composition 4.

Using the black resin composition 4, black matrix 4 was prepared in the same manner as Example 1.

Example 5

The angle of diffraction 2θ of the peak originated from the (200) plane of titanium nitride compound particles (sample 5, manufactured by NISSHIN ENGINEERING INC., TiN UFP Lot 13307218) prepared by thermal plasma method was 42.60°. The crystallite size determined from the half bandwidth of this peak was 38.3 nm and the BET specific surface area was 31.7 m²/g. The composition analysis revealed that the content of titanium was 73.5% by weight; the content of nitrogen was 20.4% by weight; and the content of oxygen was 4.63% by weight. Any X-ray diffraction peaks originated from $TiO_2$ were not observed at all.

Except that the sample 5 instead of the sample 1 was used as a pigment to be used, the same procedure as in Example 1 was carried out to obtain pigment dispersion 5 and black resin composition 5.

Using the black resin composition 5, black matrix 5 was prepared in the same manner as Example 1.

Example 6

The angle of diffraction 2θ of the peak originated from the (200) plane of a commercially available titanium nitride sample (sample 6, manufactured by Wako Pure Chemical Industries, Ltd., Titanium nitride) was 42.57°. The crystallite size determined from the half bandwidth of this peak was 44.6 nm and the BET specific surface area was 12.4 m²/g. The composition analysis revealed that the content of titanium was 74.3% by weight; the content of nitrogen was 20.3% by weight; and the content of oxygen was 2.94% by weight. Any X-ray diffraction peaks originated from $TiO_2$ were not observed at all.

Except that the sample 6 instead of the sample 1 was used as a pigment to be used, the same procedure as in Example 1 was carried out to obtain pre-dispersion 6.

Thereafter, except that the pre-dispersion 6 was provided in Dyno-Mill KDL (manufactured by Shinmaru Enterprises Corporation) 85%-filled with zirconia beads having a diameter of 0.40 mm (manufactured by Toray Industries, Inc., Torayceram beads) and dispersion treatment was carried out at a revolving rate of 11 m/s for four hours, Pigment dispersion 6 and black resin composition 6 were obtained in the same manner as Example 1.

Using the black resin composition 6, black matrix 6 was prepared in the same manner as Example 1.

Example 7

The angle of diffraction 2θ of the peak originated from the (200) plane of a commercially available titanium nitride sample (sample 7, manufactured by Wako Pure Chemical Industries, Ltd., Titanium nitride with an average particle diameter of 1.0 to 1.5 μm) was 42.51°. The crystallite size determined from the half bandwidth of this peak was 67.7 nm and the BET specific surface area was 2.0 m²/g. The composition analysis revealed that the content of titanium was 76.2% by weight; the content of nitrogen was 20.3% by weight; and the content of oxygen was 1.43% by weight. No X-ray diffraction peaks originated from $TiO_2$ were observed at all.

Except that the sample 7 instead of the sample 6 was used as a pigment to be used, the same procedure as in Example 6 was carried out to obtain pigment dispersion 7 and black resin composition 7.

Using the black resin composition 7, black matrix 7 was prepared in the same manner as Example 1.

Example 8

A commercially available titanium nitride sample (manufactured by Wako Pure Chemical Industries, Ltd., Titanium nitride with an average particle diameter of 1.0 to 1.5 μm) was dry-milled at a grinding pressure of 1.4 MPa with Nano Jetmizer (manufactured by Aishin Nano Technologies Co., Ltd.) to obtain sample 8. The angle of diffraction 2θ of the peak originated from the (200) plane of the sample 8 was 42.48°. The crystallite size determined from the half bandwidth of this peak was 55.5 nm and the BET specific surface area was 3.2 m²/g. The composition analysis revealed that the content of titanium was 76.7% by weight; the content of nitrogen was 19.9% by weight; and the content of oxygen was 1.78% by weight. No X-ray diffraction peaks originated from $TiO_2$ were observed at all.

Except that the sample 8 instead of the sample 6 was used as a pigment to be used, the same procedure as in Example 6 was carried out to obtain pigment dispersion 8 and black resin composition 8.

Using the black resin composition 8, black matrix 8 was prepared in the same manner as Example 1.

Example 9

To the pigment dispersion 4 using the sample 4 (781 g), were added poly(amic acid) A-1 (31 g), γ-butyrolactone (86 g), N-methyl-2-pyrrolidone (69 g), 3-methyl-3-methoxybutyl acetate (32 g), a surfactant LC951 (manufactured Kusumoto Chemicals, Ltd., 1 g) to yield black resin composition 9 having a total solid concentration of 10% by weight and pigment/resin (weight ratio)=75/25.

Using the black resin composition 9, black matrix 9 was prepared in the same manner as Example 1 except that coating was carried out such that the thickness of the black matrix is 0.70 μm.

Example 10

Except that the sample 4 instead of the sample 6 was used as a pigment to be used, the same procedure as in Example 6 was carried out to obtain pigment dispersion 10 and black resin composition 10.

Using the black resin composition 10, black matrix 10 was prepared in the same manner as Example 1.

Example 11

Carbon black ("MA100", manufactured by Mitsubishi Kasei Corporation, 96 g), poly(amic acid) solution A-1 (120 g), γ-butyrolactone (114 g), N-methyl-2-pyrrolidone (538 g), and 3-methyl-3-methoxybutyl acetate (132 g) were added to a tank and stirred with a homo mixer (manufactured by Tokusyu Kika Kogyo) for a hour to obtain pre-dispersion 11. Thereafter, the pre-dispersion 11 was provided in Ultra Apex Mill (manufactured by KOTOBUKI INDUSTRIES CO., LTD.) equipped with a centrifugation separator 70%-filled with zirconia beads with a diameter of 0.05 mm (manufactured by Nikkato Corporation, YTZ balls), and dispersion treatment was carried out for two hours at a revolving rate of 8 m/s to obtain a pigment dispersion 11 having a solid concentration of 12% by weight, and pigment/resin (weight ratio)=80/20.

The pigment dispersion 11 (164 g) and the pigment dispersion 4 using the sample 4 (492 g) were mixed and stirred. To this mixture poly(amic acid) A-1 (106 g), γ-butyrolactone (76 g), N-methyl-2-pyrrolidone (112 g), 3-methyl-3-methoxybutyl acetate (48 g) and a surfactant LC951 (manufactured Kusumoto Chemicals, Ltd., 1 g) were added to yield black resin composition 11 having a total solid concentration of 10% by weight and pigment/resin (weight ratio)=63/37.

Using the black resin composition 11, black matrix 11 was prepared in the same manner as Example 1.

Example 12

The sample 4 (200 g), 3-methyl-3-methoxybutanol 45% (by weight) solution of the acrylic polymer (P-1) (100 g), and propylene glycol tertiary butyl ether (700 g) were fed together to a tank and stirred with a homo mixer (manufactured by Tokusyu Kika Kogyo) for a hour to obtain a pre-dispersion 12. Thereafter, the pre-dispersion 12 was provided in Ultra Apex Mill (manufactured by KOTOBUKI INDUSTRIES CO., LTD.) equipped with a centrifugation separator 70%-filled with zirconia beads with a diameter of 0.05 mm (manufactured by Nikkato Corporation, YTZ balls), and dispersion treatment was carried out for two hours at a revolving rate of 8 m/s to obtain pigment dispersion 12 having a solid concentration of 24.5% by weight, and pigment/resin (weight ratio)=82/18.

To the pigment dispersion 12 (525.8 g), a solution containing 50% by weight solution of bis-phenoxyethanol fluorene diacrylate (27.0 g) in propylene glycol monomethyl ether acetate, 50% by weight solution of dipentaerythritol hexaacrylate (manufactured by Nippon Kayaku Co., Ltd., DHPA) (27.0 g) as a multi-functional monomer in propylene glycol monomethyl ether acetate, "Irgacure (registered trademark)" 369 (14.7 g), Asahi Denka Kogyo K.K., Adeka (registered trademark) optomer" N-1919 (4.0 g), and N,N'-tetraethyl-4,4'-diaminobenzophenone (1.5 g) as a photoinitiator, 8.57 g of AP-1 (50% (by weight) solution as an adhesion promoter, and a 10% by weight solution of propylene glycol monomethyl ether acetate solution (3.6 g) which is a silicone-based surfactant, in 3-methyl-3-methoxy-butyl acetate (374.8 g) and propylene glycol monomethyl ether acetate (14.4 g), was added, to obtain black resin composition 12 having a total solid concentration of 18% by weight, and pigment/resin (weight ratio)=67.5/22.5.

The black resin composition 12 was coated on a non-alkali glass (manufactured by Corning Incorporated, "1737") substrate with a curtain flow coater, and vacuum-dried at 80° C., $10^{-1}$ Torr for 2 minutes. Thereafter, the resultant was prebaked at 90° C. for 2 minutes, exposed (200 mJ/cm$^2$) via a photomask using an exposure apparatus "XG-5000" manufactured by DAINIPPON SCREEN MFG. CO., LTD., and developed with 0.04% (by mass) KOH aqueous solution, followed by washing with aqua purificata, to obtain a patterning substrate. Further, the patterning substrate was cured at 230° C. for 30 minutes, thereby preparing black matrix 12 with a thickness of 0.8 μm.

Comparative Example 1

The angle of diffraction 2θ of the peak originated from the (200) plane of a commercially available pigment "13-MC" (sample 9, manufactured by Mitsubishi Material Corporation) was 42.91°. The crystallite size determined from the half bandwidth of this peak was 29.6 nm and the BET specific surface area was 20.3 m$^2$/g. The composition analysis revealed that the content of titanium was 70.3% by weight; the content of nitrogen was 17.8% by weight; and the content of oxygen was 10.3% by weight. X-ray diffraction peaks originated from TiO$_2$ were seen at 25.28° and 27.44°.

Except that the sample 9 instead of the sample 1 was used as a pigment to be used, the same procedure as in Example 1 was carried out to obtain pigment dispersion 13 and black resin composition 13.

Using the black resin composition 13, black matrix 13 was prepared in the same manner as Comparative example 1 except that coating was carried out such that the thickness of the black matrix is 1.2 μm.

Comparative Example 2

The angle of diffraction 2θ of the peak originated from the (200) plane of the titanium nitride oxide Bk1 (sample 10) was 43.01°. The crystallite size determined from the half bandwidth of this peak was 28.8 nm and the BET specific surface area was 20.7 m$^2$/g. The composition analysis revealed that the content of titanium was 70.6% by weight; the content of nitrogen was 18.8% by weight; and the content of oxygen was 8.64% by weight. X-ray diffraction peaks originated from TiO$_2$ were seen at 25.3° and 27.42°.

Except that the sample 10 instead of the sample 1 was used as a pigment to be used, the same procedure as in Example 1 was carried out to obtain pigment dispersion 14 and black resin composition 14.

Using the black resin composition 14, black matrix 14 was prepared in the same manner as Example 1.

Table 1 shows the properties of the titanium nitride compound particles or titanium nitride oxide used in Examples 1 to 12 and Comparative examples 1 and 2. FIG. 2 shows the composition of the black resin composition and the results of evaluation of the resin black matrix prepared using the black resin composition. FIG. 1 shows the spectrum of X-ray diffraction of the sample 4 and sample 9.

It is seen that any of the resin black matrixes prepared using the titanium nitride compound particles shown in Examples has a high OD value, adhesion, and high volume resistance.

TABLE 1

|  | Peak angle of diffraction 2θ derived from (200) plane (°) | Half bandwidth derived from (200) plane (°) | Crystallite size (nm) | Specific surface area (m$^2$/g) | BET-converted Particle diameter (nm) | Titanium content (weight %) | Nitrogen content (weight %) | Oxygen content (weight %) | TiO$_2$ peak |
| --- | --- | --- | --- | --- | --- | --- | --- | --- | --- |
| Sample 1 | 42.65 | 0.517 | 17.0 | 105.8 | 10.9 | 69.9% | 19.1% | 9.94% | Absent |
| Sample 2 | 42.65 | 0.530 | 16.5 | 55.8 | 20.5 | 69.8% | 18.6% | 9.95% | Absent |
| Sample 3 | 42.61 | 0.354 | 25.6 | 45.6 | 25.1 | 69.9% | 15.4% | 13.7% | Marginally present |
| Sample 4 | 42.62 | 0.314 | 29.4 | 36.0 | 31.8 | 72.2% | 19.4% | 6.37% | Absent |
| Sample 5 | 42.60 | 0.253 | 38.3 | 31.7 | 36.1 | 73.5% | 20.4% | 4.63% | Absent |
| Sample 6 | 42.57 | 0.226 | 44.6 | 12.4 | 92.3 | 74.3% | 20.3% | 2.94% | Absent |
| Sample 7 | 42.51 | 0.174 | 67.7 | 2.0 | 572.5 | 76.2% | 20.3% | 1.43% | Absent |
| Sample 8 | 42.48 | 0.195 | 55.5 | 3.2 | 357.8 | 76.7% | 19.9% | 1.78% | Absent |
| Sample 9 | 42.91 | 0.313 | 29.6 | 20.3 | 67.4 | 70.3% | 17.8% | 10.3% | Present |
| Sample 10 | 43.01 | 0.320 | 28.8 | 20.7 | 68.7 | 70.6% | 18.8% | 8.64% | Present |

TABLE 2

| | Composition of black resin compositions | | | | Dispersion conditions | Results of evaluation of resin black matrix | | | | |
|---|---|---|---|---|---|---|---|---|---|---|
| | Pigment component | Resin component | Solid concentration (wt %) | Pigment/ resin ratio (wt %) | Dispersion bead diameter (mmφ) | Film thickness (μm) | OD value | Peak wavelength of transmitted light (nm) | Adhesion strength (Mpa) | Volume resistivity (Ω · cm) |
| Example 1 | Sample 1 | A-1 | 10.0 | 70/30 | 0.05 | 1.00 | 4.59 | 475 | 8.7 | $6.12 \times 10^9$ |
| Example 2 | Sample 2 | A-1 | 10.0 | 70/30 | 0.05 | 1.00 | 4.79 | 440 | 9.8 | $1.68 \times 10^{10}$ |
| Example 3 | Sample 3 | A-1 | 10.0 | 70/30 | 0.05 | 1.00 | 4.65 | 420 | 10.8 | $1.33 \times 10^{12}$ |
| Example 4 | Sample 4 | A-1 | 10.0 | 70/30 | 0.05 | 1.00 | 5.43 | 410 | 13.0 | $1.14 \times 10^{12}$ |
| Example 5 | Sample 5 | A-1 | 10.0 | 70/30 | 0.05 | 1.00 | 5.37 | 410 | 13.2 | $7.74 \times 10^{11}$ |
| Example 6 | Sample 6 | A-1 | 10.0 | 70/30 | 0.40 | 1.00 | 5.00 | 420 | 7.3 | $1.13 \times 10^{10}$ |
| Example 7 | Sample 7 | A-1 | 10.0 | 70/30 | 0.40 | 1.00 | 4.46 | 440 | 5.5 | $9.30 \times 10^6$ |
| Example 8 | Sample 8 | A-1 | 10.0 | 70/30 | 0.40 | 1.00 | 4.57 | 440 | 6.2 | $4.89 \times 10^7$ |
| Example 9 | Sample 4 | A-1 | 10.0 | 75/25 | 0.05 | 0.70 | 4.07 | 410 | 11.1 | $1.64 \times 10^{10}$ |
| Example 10 | Sample 4 | A-1 | 10.0 | 70/30 | 0.40 | 1.00 | 5.03 | 410 | 10.9 | $3.42 \times 10^{11}$ |
| Example 11 | Sample 4 + carbon | A-1 | 10.0 | 63/37 | 0.05 | 1.00 | 5.11 | 450 | 12.9 | $1.26 \times 10^5$ |
| Example 12 | Sample 4 | P-1 | 18.0 | 67.5/32.5 | 0.05 | 0.80 | 4.14 | 410 | 13.6 | $3.23 \times 10^{12}$ |
| Comparative Example 1 | Sample 9 | A-1 | 10.0 | 70/30 | 0.05 | 1.20 | 4.09 | 480 | 10.7 | $3.20 \times 10^8$ |
| Comparative Example 2 | Sample 10 | A-1 | 10.0 | 70/30 | 0.05 | 1.00 | 4.04 | 480 | 10.6 | $2.02 \times 10^8$ |

Example 13

Preparation of the Colored Resin Composition

Green pigment (Pigment Green 36); 44 g, yellow pigment (Pigment Yellow 138); 19 g, poly(amic acid) A-2; 47 g, and γ-butyrolactone; 890 g were added to a tank and stirred with a homo mixer (manufactured by Tokusyu Kika Kogyo) for a hour, to obtain G pigment pre-dispersion G1. Subsequently, the pre-dispersion G1 was provided in Dyno-Mill KDL (manufactured by Shinmaru Enterprises Corporation) 85%-filled with zirconia beads with a diameter of 0.40 mm (Torayceram beads, manufactured by Toray Industries, Inc.) and dispersion treatment was carried out at a revolving rate of 11 m/s for three hours to yield dispersion G1 having a solid concentration of 7% by weight and pigment/polymer (weight ratio)=90/10. The dispersion G1 was diluted with the poly (amic acid) A-2 and solvent to yield a green resin composition.

In the same manner, instead of green pigment and yellow pigment, red pigment (Pigment Red 254); 63 g was added to obtain R pigment dispersion R1 having the solid concentration of 7% by weight and pigment/polymer (weight ratio)=90/10. Further, the R pigment dispersion R1 was diluted with the poly(amic acid) A-2 and solvent to yield a red resin composition.

In the same manner, instead of green pigment and yellow pigment, blue pigment (Pigment Red 15:6); 63 g was added to obtain B pigment dispersion B1 having the solid concentration of 7% by weight and pigment/polymer (weight ratio)=90/10. Further, the B pigment dispersion B1 was diluted with the poly(amic acid) A-2 and solvent to yield a blue resin composition.

The resin black matrix 9 processed in Example 9 was coated with a red paste was coated such that the thickness of the film after dried was 2.0 μm, and the resultant was subjected to pre-baking to form a polyimide precursor red color film. Using a positive photoresist, with the same method as described above, red pixels were formed and heat curing was carried out at 290° C. In the same manner, a green paste was coated to form green pixels and the heat curing was carried out at 290° C. Continuously, a blue paste was coated to form blue pixels and the heat curing was carried out at 290° C.

The thus obtained color filter was a color filter 1 having the resin black matrix in the frame portion, an OD value of as high as 4.07, and having an excellent flatness such that the highest step of the surface pixel of the color filter was not more than 0.15 μm.

Production of the Liquid Crystal Display

The obtained color filter 1 was washed with a neutral detergent, coated with an alignment layer constituting a polyimide resin by the printing method, and heated in a hot plate at a temperature of 250° C. for ten minutes. The film thickness was 0.07 μm. Subsequently, a color filter substrate was subjected to rubbing treatment, coated a sealing agent by the dispense method, and heated in a hot plate at 90° C. for ten minutes. Meanwhile, a substrate with TFT array being formed on a glass was washed in the same manner, coated with an alignment layer and heated. Subsequently, the resultant was sprayed with a ball spacer with a diameter of 5.5 μm, overlapped with a color filter substrate coated with a sealing agent, heated under increased pressure at a temperature of 160° C. for 90 minutes to cure the sealing agent. This cell was left to stand at a temperature of 120° C. under a pressure of 13.3 Pa for four hours. Then it was left to stand in nitrogen for 0.5 hours and liquid crystal injection was again carried out under vacuum. The cell was placed in a chamber and the pressure was reduced to 13.3 Pa at room temperature. Subsequently, the liquid crystal injection port was immersed in liquid crystals and the pressure was recovered to ordinary pressure with nitrogen, thereby carrying out liquid crystal injection. After the liquid crystal injection, the liquid crystal injection port was closed with a UV curing resin. Subsequently, a polarizing plate was adhered to the outside of two glass substrates of the cell, thereby completing the cell. Further, the obtained cell was modularized to complete liquid crystal display 1. Observation of the obtained liquid crystal display 1 found that there were no display defects. Contrast was excellent due to high light shielding of the resin black matrix. One hundred liquid crystal displays were prepared in the same procedure. Because adhesion of the resin black matrix was high, there were not any defects including peeling in the sealing portion during liquid crystal injection at all.

Comparative Example 3

The same procedure as in Example 13 was carried out to form a color filter except that black matrix 13 was used as a black matrix to be used. Obtained was a color filter 2 having the resin black matrix in the edge portions, the OD value of 4.09 and the height of the surface pixel steps of 0.35 μm at maximum.

The same procedure as in Example 13 was carried out to obtain liquid crystal display 2 except that the color filter 2 was used. Observation of the liquid crystal display 2 revealed that there were display defects due to the defective alignment of the liquid crystal resulted from a large pixel surface steps/flatness.

The invention claimed is:

1. A black resin composition comprising at least a light shielding agent, a resin and a solvent, said light shielding agent containing at least titanium nitride compound particles, wherein an angle of diffraction 2Θ of a peak originating from (200) plane of said titanium nitride compound particles when CuKα line is used as an X-ray source is not less than 42.5° and less than 42.7°, wherein a crystallite size determined from half bandwidth of the peak originated from the (200) plane when CuKα line is used as the X-ray source is not more than 50 nm, and wherein a specific surface area of said titanium nitride compound particles determined by BET method is not less than 31.7 m$^2$/g and not more than 105.8 m$^2$/g, wherein an angle of diffraction pattern of said titanium nitride compound particles contains substantially no TiO$_2$ peak.

2. The black resin composition according to claim 1, wherein an amount of oxygen atoms contained in said titanium nitride compound particles is not more than 12% by weight.

3. The black resin composition according to claim 1, wherein said titanium nitride compound particles are prepared by a thermal plasma method.

4. A resin black matrix comprising a film of said black resin composition according to claim 1, wherein the resin black matrix has an optical density (OD value) of not less than 4.0 per 1.0 μm thickness of the film.

5. A color filter comprising said resin black matrix according to claim 4.

6. A liquid crystal display comprising said color filter according to claim 5.

* * * * *